United States Patent [19]
Diehl et al.

[11] Patent Number: 5,846,268
[45] Date of Patent: Dec. 8, 1998

[54] PROCESS FOR PRODUCING LIQUID PIG IRON OR LIQUID STEEL PREPRODUCTS AND SPONGE IRON AS WELL AS A PLANT FOR CARRYING OUT THE PROCESS

[75] Inventors: Jörg Diehl, Linz; Gerald Rosenfellner, St.Peter/Au, both of Austria

[73] Assignee: Voest-Alpine Industieanlagenbau GmbH, Linz, Austria

[21] Appl. No.: 817,151

[22] PCT Filed: Aug. 1, 1996

[86] PCT No.: PCT/AT96/00140

§ 371 Date: Apr. 11, 1997

§ 102(e) Date: Apr. 11, 1997

[87] PCT Pub. No.: WO97/07247

PCT Pub. Date: Feb. 27, 1997

[30] Foreign Application Priority Data

Aug. 16, 1995 [AT] Austria ..................................... 1379/95

[51] Int. Cl.⁶ ........................................................ C10J 3/20
[52] U.S. Cl. ................................ 48/92; 48/197 R; 75/492
[58] Field of Search .................... 48/92, 197 R; 75/492

[56] References Cited

FOREIGN PATENT DOCUMENTS

| | | |
|---|---|---|
| 0487856 | 6/1992 | European Pat. Off. . |
| 3713630 | 11/1988 | Germany . |
| 4037977 | 6/1992 | Germany . |
| 4421673 | 1/1995 | Germany . |

OTHER PUBLICATIONS

D. Siuka, et al., "Corex Leads Smelting Reduction Race", Steel Times International, vol. 18, No. 2, Mar. 1994, pp. 12–13.

*Primary Examiner*—Timothy McMahon
*Attorney, Agent, or Firm*—Ostrolenk, Faber, Gerb & Soffen, LLP

[57] ABSTRACT

A process for producing liquid pig iron or liquid steel preproducts and sponge iron from iron ore. The iron ore in a first reduction zone (4) is directly reduced to sponge iron. The sponge iron in a meltdown gasifying zone (10) is melted under the supply of carbon carriers and an oxygen-containing gas, and a reducing gas containing CO and $H_2$ is produced. The reducing gas is introduced into the first reduction zone (4), is reacted there, and is drawn off as an export gas. The drawn-off export gas is subjected to $CO_2$ elimination as well as heating, and as a reducing gas, at least largely free of $CO_2$, is fed to at least one further reduction zone (29) for the direct reduction of iron ore. In order to enable the export gas drawn off the further reduction zone (29) to be utilized as completely as possible, heat of the export gas leaving the further reduction zone (29) is used for heating the export gas derived from the first reduction zone (4).

19 Claims, 6 Drawing Sheets

PROCESS FOR PRODUCING LIQUID PIG IRON OR LIQUID STEEL PREPRODUCTS AND SPONGE IRON AS WELL AS A PLANT FOR CARRYING OUT THE PROCESS

BACKGROUND OF THE INVENTION

1. Field of the Invention

The invention relates to a process and a plant for producing liquid pig iron or liquid steel preproducts and sponge iron from charging substances comprised of iron ore, preferably in lumps and/or pellets, and optionally fluxes. The charging substances in a first reduction zone are directly reduced to sponge. The sponge iron in a meltdown gasifying zone is melted under the supply of carbon carriers and an oxygen-containing gas. A reducing gas containing CO and $H_2$ is produced, which is introduced into the first reduction zone, is reacted there and is drawn off as an export gas. The drawn-off export gas is subjected to $CO_2$ elimination as well as heating and, as a reducing gas at least largely free of $CO_2$ is fed to at least one further reduction zone for the direct reduction of further iron ore, After the reaction with the iron ore, the gas is drawn off as an export gas.

2. Description of the Related Art

A process of this type is known, for instance, from DE-C 40 37 977. In that known process, export gas drawn off the further reduction zone is subjected to scrubbing and subsequently is subjected to $CO_2$ elimination as well as heating together with the export gas derived from the first reduction zone. This mixed gas is then fed to the further reduction process as a reducing gas. Thereby it is feasible to utilize a portion of the reductants still present in the export gas derived from the further reduction zone, since that export gas is fed to the further reduction process as a recycle reducing gas.

The reducing gas fed to the further reduction process in that known process at first is subjected to preheating in a heat exchanger and subsequently is heated to the temperature required for the direct reduction in a second heating stage, the further heating being accomplished by a partial combustion of the reducing gas.

However, such a partial combustion causes deterioration of the quality of the reducing gas, because reductants are consumed and the $CO_2$ and/or $H_2O$ contents are increased. The increase in the $CO_2$ content to a value that is too high may be compensated for by the reducing gas having only very slight contents of $CO_2$ and $H_2O$ prior to heating. Yet, this involves the disadvantage that, due to a strict specification with a view to the residual content of $CO_2$, reductants are discharged along with the offgas leaving the $CO_2$ elimination plant.

SUMMARY OF THE INVENTION

The invention aims at avoiding these drawbacks and difficulties and has as its object to provide a process, as well as a plant for carrying out the process, which enable the utilization as complete as possible of the energy of the export gas derived from the further reduction process, in particular by saving its reductants. In addition, minimization of the energy to be externally fed into the further reduction process is to be reached. Moreover, the $CO_2$ elimination plant is to be operable in an efficient manner, i.e., with a loss of reductants as slight as possible, while nevertheless ensuring sufficiently low $CO_2$ and $H_2O$ contents in the reducing gas fed to the further reduction zone.

In a process of the initially defined kind, this object is achieved in that heat of the export gas leaving the further reduction zone is used for heating the export gas derived from the first reduction zone.

It is a particular object of the invention to use a minimum portion of export gas, derived from the further reduction process, for heating the reducing gas fed to the further reduction zone, such that this export gas will be available to the further reduction process as a recycle reducing gas in an amount as large as possible.

This object is achieved in that, for heating, sensible heat is recuperatively withdrawn from the export gas drawn off the further reduction zone in the hot unscrubbed state, and by means of a heat carrier, is transmitted to the export gas derived from the first reduction zone, the heat carrier advantageously being comprised of scrubbed export gas from the further reduction zone.

For heating the export gas derived from the first reduction process, according to a preferred embodiment, export gas drawn off the further reduction zone after scrubbing is recuperatively heated and burned by unscrubbed export gas of the further reduction zone, the smoke gases recuperatively heating the export gas derived from the first reduction zone. As a result, the amount of export gas used for combustion is minimized, a greater amount of export gas thus being available to recycling, and a considerable increase in the capacity of the plant finally being reached.

According to a further preferred embodiment, preheating of the export gas derived from the first reduction zone is effected by burning export gas derived from the further reduction zone, and by the recuperative heat transfer of the heat contained in the smoke gases. Subsequently further heating is effected by a partial combustion of the export gas derived from the first reduction zone, the thermal energy not consumed in the further reduction process being fed to the partial combustion process.

In doing so, oxygen or oxygen-containing gas used for the partial combustion advantageously is subjected to recuperative heating by means of chemically bound and/or sensible heat contained in the export gas derived from the further reduction process.

This offers the advantage of minimizing the oxygen consumption and also of minimizing the consumption of reducing gas for the partial combustion. This, in turn, allows for a higher $CO_2$ specification in the purified export gas for the $CO_2$ elimination plant, which results not only in the further utilization of the residual energy, but also in a higher-quality reducing gas (containing a higher amount of reductants) and an elevated production output.

These advantages are augmented if at least a portion of the export gas drawn off the further reduction zone is burned and the smoke gas thereby forming recuperatively gives off sensible heat to the oxygen or oxygen-containing gas, respectively.

An additional enhancement of these advantages may be achieved in that a portion of the preheated export gas drawn off the first reduction zone is used as a combustion gas along with oxygen and/or an oxygen-containing gas for burning the same.

Furthermore, it is suitable if, for burning export gas derived from the further reduction zone, air is admixed to the export gas, which air is recuperatively heated by smoke gas forming in the combustion of export gas drawn off the further reduction zone.

A plant for carrying out the process, includes a first reduction reactor for iron ore, preferably supplied in lumps and/or pellets, and a meltdown gasifier. A supply duct for a reducing gas connects the melter gasifier with the first reduction reactor. A conveying duct for the reduction product formed in the first reduction reactor connects the first reduction reactor with the melter gasifier. An export-gas discharge duct departing from the first reduction reactor. Supply ducts for oxygen-containing gases and carbon carriers run into the melter gasifier. A tap for pig iron and slag is provided at the melter gasifier. At least one additional reduction reactor receives additional iron ore. A reducing-gas supply duct is provided to that reduction reactor. An export-gas discharge duct departs from the further reduction reactor, as well as a discharge means for the reduction product formed in that further reduction reactor. The export-gas discharge duct of the first reduction reactor runs into a $CO_2$ elimination plant, from which the reducing-gas supply duct of the additional reduction reactor departs and runs into the additional reduction reactor via a heating means for the export gas purified from $CO_2$. The export-gas discharge duct of the further reduction reactor runs into a heat exchanger and from there leads to a scrubber. A branch duct branches off the export-gas discharge duct after that scrubber, runs into the heat exchanger for the purpose of recuperatively heating the branched-off scrubbed export gas by means of unscrubbed export gas and, departing therefrom, is conducted to the heating means.

It is suitable if the branch duct runs into a burner of the heating means and if the smoke gas of the burner, by means of a smoke-gas duct via a heat exchanger, is conducted to the recuperative heating of an oxygen-containing gas or oxygen fed to the heating means via the duct.

Preferably, the branch duct runs into a burner of the heating means and the smoke gas of the burner is fed to the recuperative heating of an oxygen-containing gas, such as air, by means of a smoke-gas discharge duct via a heat exchanger, the heated air being fed to the burner of the heating means via a duct.

A preferred embodiment is characterized in that a branch duct departs from the reducing-gas supply duct after the heat exchanger serving to heat the reducing gas fed to the further reduction reactor, and runs into an afterburning means together with a duct supplying oxygen or an oxygen-containing gas.

Another preferred plant comprises a first reduction reactor for iron ore, preferably supplied in lumps and/or pellets, and a melter gasifier. A supply duct for a reducing gas connects the melter gasifier with the first reduction reactor. A conveying duct for the reduction product formed in the first reduction reactor connects the first reduction reactor with the melter gasifier. An export-gas discharge duct departs from the first reduction reactor. Supply ducts for oxygen-containing gases and carbon carriers run into the melter gasifier. A tap for pig iron and slag is provided at the melter gasifier. At least one additional reduction reactor for receives additional iron ore. A reducing-gas supply duct is provided to that reduction reactor. An export-gas discharge duct departs from the further reduction reactor, as well discharge means for the reduction product formed in that further reduction reactor. The export-gas discharge duct of the first reduction reactor runs into a $CO_2$ elimination plant, from which the reducing-gas supply duct of the additional reduction reactor departs and runs into the additional reduction reactor via a heating means for the export gas purified from $CO_2$. From the export-gas discharge duct of the further reduction reactor, a branch duct runs into a burner of the heating means. That smoke gas of the burner, by means of a smoke-gas discharge duct, via a heat exchanger, is conducted to the recuperative heating of an oxygen-containing gas, such as air, or of oxygen, and the heated oxygen-containing gas or the oxygen, respectively, is conducted to the heating means via a duct.

Suitably, the heated oxygen-containing gas or the heated oxygen gets into an afterburning means of the heating means together with reducing gas fed via a branch duct departing from the reducing-gas supply duct.

BRIEF DESCRIPTION OF THE DRAWINGS

In the following the invention will be explained in more detail by way of several exemplary embodiments, FIGS. 1 to 6 each illustrating a process variant represented in a block diagram.

DETAILED DESCRIPTION OF THE PREFERRED EMBODIMENTS

In a first reduction reactor designed as a shaft furnace 1 particulate iron-oxide-containing material, preferably lumpy iron ore, and possible fluxes are supplied by means of a duct 2 in a known manner as in accordance with FIGS. 1 to 4. Reducing gas is blown into the reduction shaft furnace 1 by means of a supply duct 3 so as to rise upwardly in counterflow to the descending iron ore, effecting the reduction of the charge in the reduction zone 4. After having flown through the shaft furnace 1, that gas is discharged as an export gas by means of an export-gas discharge duct 5. The reduced burden, which contains iron in the form of sponge iron, gets into a melter gasifier 7 via conveying ducts preferably designed as downpipes 6. A lumpy carbon carrier, for instance in the form of brown-coal high-temperature coke as well as optionally coal, through a duct 8 and, furthermore, an oxygen-containing gas through a duct 9, are supplied to the melter gasifier 7 in a known manner.

By "sponge iron" a solid final or intermediate product is meant, which is formed of an iron oxide by direct reduction exclusively via the solid phase, i.e., without it being necessary to follow a path via a liquid intermediate product.

In the meltdown gasifying zone 10 formed within the melter gasifier 7 the burden or sponge iron falls from top onto a fluidized bed formed of lumpy carbon carriers and maintained by the oxygen-containing gas blown in. By burning the coke as well as optionally the coal under the action of the oxygen-containing gas, so much heat is produced in the fluidized bed that the sponge iron is melted. In the molten state, it is completely reduced by means of carbon such that a pig iron melt or steel preproduct collects on the bottom of the melter gasifier 7 in the liquid state. A slag melt forms above the pig iron melt. Those two melts are drawn off via appropriately arranged taps 11, 12 at predetermined time intervals.

During the combustion of coke and optionally coal in the melter gasifier 7, a reducing gas essentially consisting of CO and $H_2$ is produced, which is drawn off the melter gasifier 7 via the supply duct 3 and fed to the reduction shaft furnace 1. The purification and cooling of the reducing gas formed in the melter gasifier 7 to the temperature required for direct reduction in a manner known per se is effected via dust separators or scrubbers, which, however, is not illustrated in detail in the drawing.

The export gas drawn off through the export-gas discharge duct 5 at first is subjected to purification, for instance, in a cyclone 13 or in a scrubber in order to be freed from dust particles. After this, the export gas, by means of a compressor 14, reaches a $CO_2$ elimination plant 15, in which it is largely freed from $CO_2$ and, at the same time, from $H_2S$. The $CO_2$ elimination plant is designed, for instance, as a pressure swing adsorption plant or as a $CO_2$ scrubber.

The thus purified export gas as a reducing gas is fed to a further reduction reactor via a reducing-gas supply duct 16, which further reduction reactor is designed as a reduction shaft furnace 17 and, like the first reduction shaft furnace 1, is operated according to the counterflow principle. In that shaft furnace 17 particulate ore supplied via the ore-supply duct 18 is directly reduced. A discharge means for sponge iron formed in the shaft furnace 17 from the ore is denoted by 19.

Since the export gas destined for the purification of $CO_2$ is to be cooled to a temperature level required therefor, it is subjected to heating prior to being introduced into the further reduction shaft furnace 17. Heating is effected in two stages: At first, the purified export gas in a first stage is subjected to indirect heating, the heating means 20 serving that purpose being designed as a heat exchanger. The heat exchanger (recuperator) 20 comprises a burner 21 to which there is fed as a combustion gas an oxygen-containing gas, such as air, via a duct 22 and purified export gas drawn off the further reduction shaft furnace 17 and supplied via a branch duct 23. Heating within the heat exchanger 20 is effected to a temperature just compatible with the tube material. After this, the reducing gas recuperatively heated in the first stage is further heated in a second stage to the reducing gas temperature required for reduction by partial combustion in the afterburning means 24, in which a portion of the export gas purified from $CO_2$ and branched off the reducing-gas supply duct 16 via a branch duct 16' is burned under oxygen supply 25. In doing so, highly pure oxygen is used, the reducing gas thereby attaining the temperature required for the reduction in the further reduction shaft furnace 17 by means of a minimum amount of export gas to be burned. The temperature required ranges between 600° and 900° C.

The export gas drawn off the reduction shaft furnace 17 via the export-gas discharge duct 26 likewise is subjected to purification and cooling in a scrubber 27 in order to be purified from dust particles and cause its water vapor content to be lowered. After this, a portion of the purified export gas is branched off via the branch duct 23 and supplied to the burner 21 of the heat exchanger 20. This branch duct 23 is conducted via a heat exchanger 28 arranged between the reduction shaft furnace 17 and the scrubber 27 and penetrated by hot export gas from the further reduction process, that portion of purified export gas thus recuperatively experiencing a considerable increase in temperature. Consequently, only a slight amount of the export gas from the further reduction zone 29 of the reduction reactor 17 need be supplied to the burner 21, that portion of the export gas having been brought to a high energy level by aid of the sensible heat of the export gas drawn off the reduction shaft furnace 17.

A further portion of the export gas incurring in the further reduction shaft furnace 17 via a compressor 30 is fed also to the $CO_2$ elimination plant 15 through a conveying duct 31 running into the export-gas discharge duct 5, hence likewise being available to the $CO_2$ elimination plant and subsequently to the further reduction process as a recycle reducing gas. That portion of the export gas from the reduction shaft furnace 17 which is not required for the process according to the invention is supplied as an export gas through the export-gas discharge duct 26.

The $CO_2$-containing offgas separated from the $CO_2$ elimination plant 15 via an offgas duct 32 suitably is admixed to that portion of the export gas which has been supplied to the burner 21 of the heat exchanger 20 through the branch duct 23, advantageously before that branch duct 23 passes through the heat exchanger 28. Into the export-gas discharge duct 26 there may also run a branch duct 33 branching off the offgas duct 32 and optionally comprising a desulfurization means 34, by means of which branch duct a portion of the $CO_2$-containing offgas is admixed with the export gas.

Figure 1:
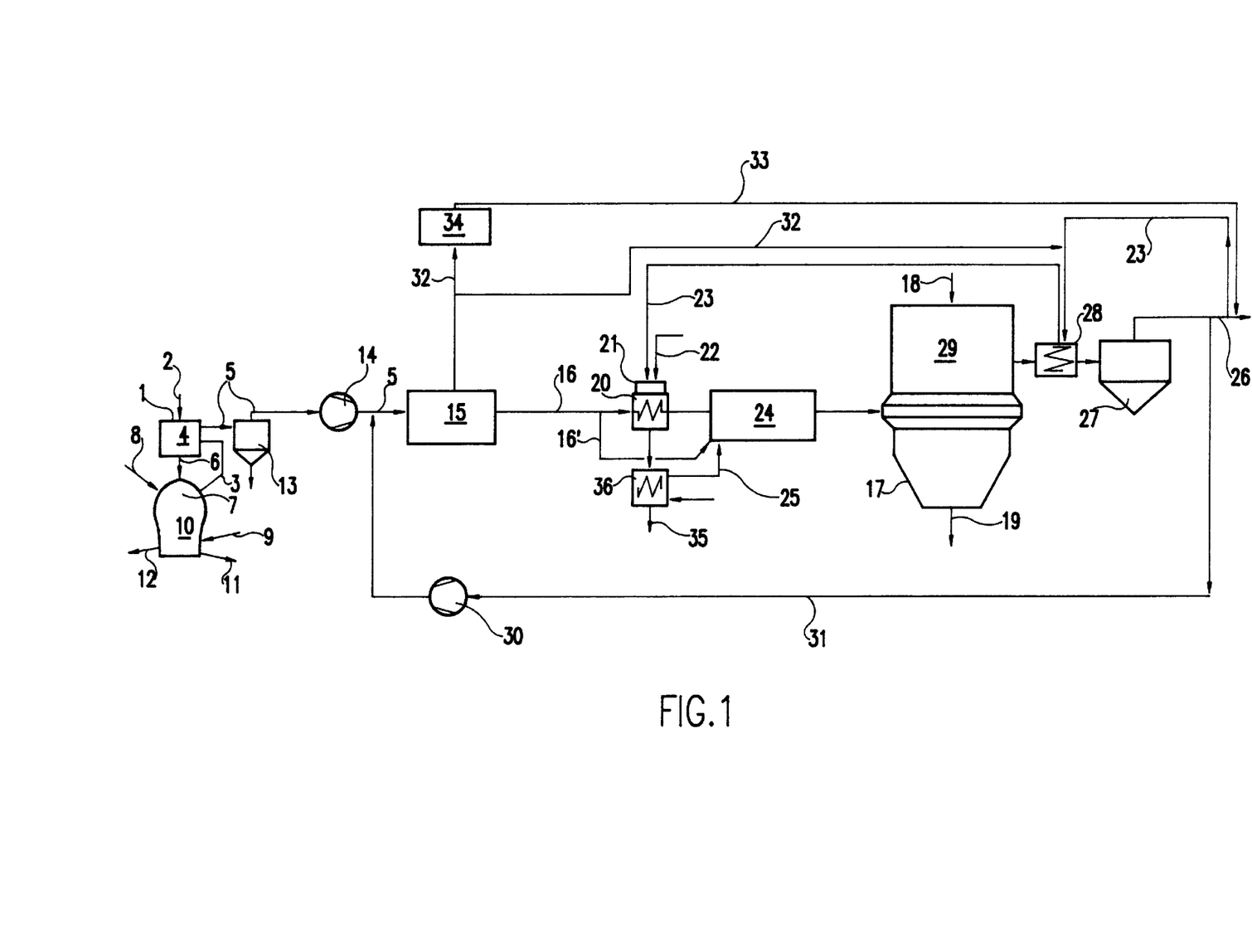

According to the variant represented in FIG. 1, the smoke gas formed in the burner 21 of the heat exchanger 20 is conducted away through a smoke-gas discharge duct 35, a heat exchanger 36 for heating oxygen being provided in the smoke-gas discharge duct 35. That oxygen is fed to the partial combustion process taking place in the afterburning means 24, by means of the oxygen supply 25. By heating the oxygen, a minimization of the oxygen consumption and also a minimization of the consumption of reducing gas used for the partial combustion are feasible.

Figure 2:
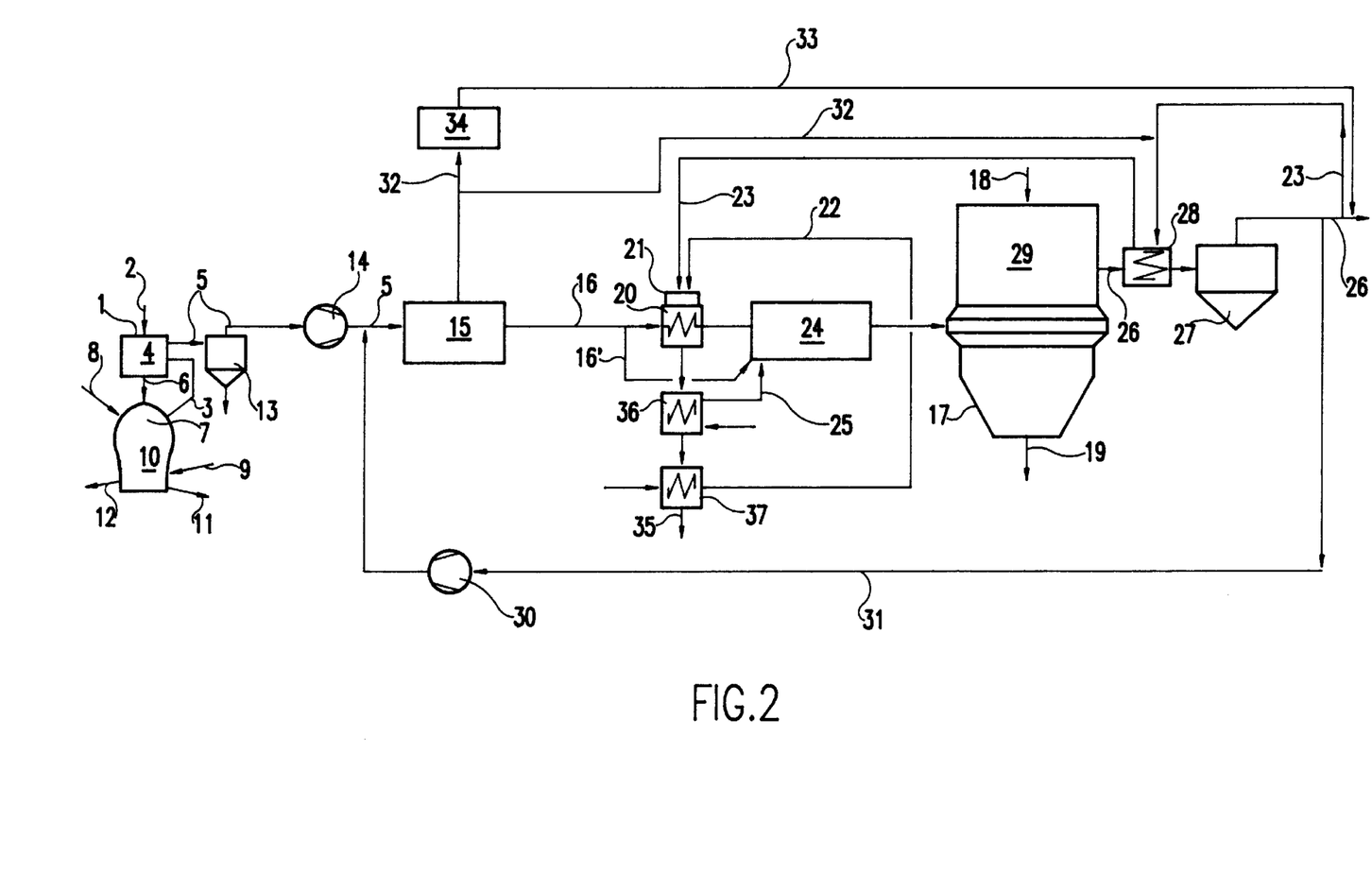

According to the process variant represented in FIG. 2, air is additionally heated by means of a further heat exchanger 37 provided in the smoke-gas discharge duct, by aid of the smoke gas formed in the burner 21 of the heat exchanger 20, the heated air being fed to the burner 21 of the heat exchanger 20 through duct 22. Thereby, the amount of export gas fed to the burner 21 of the heat exchanger 21 can be further reduced.

Figure 3:
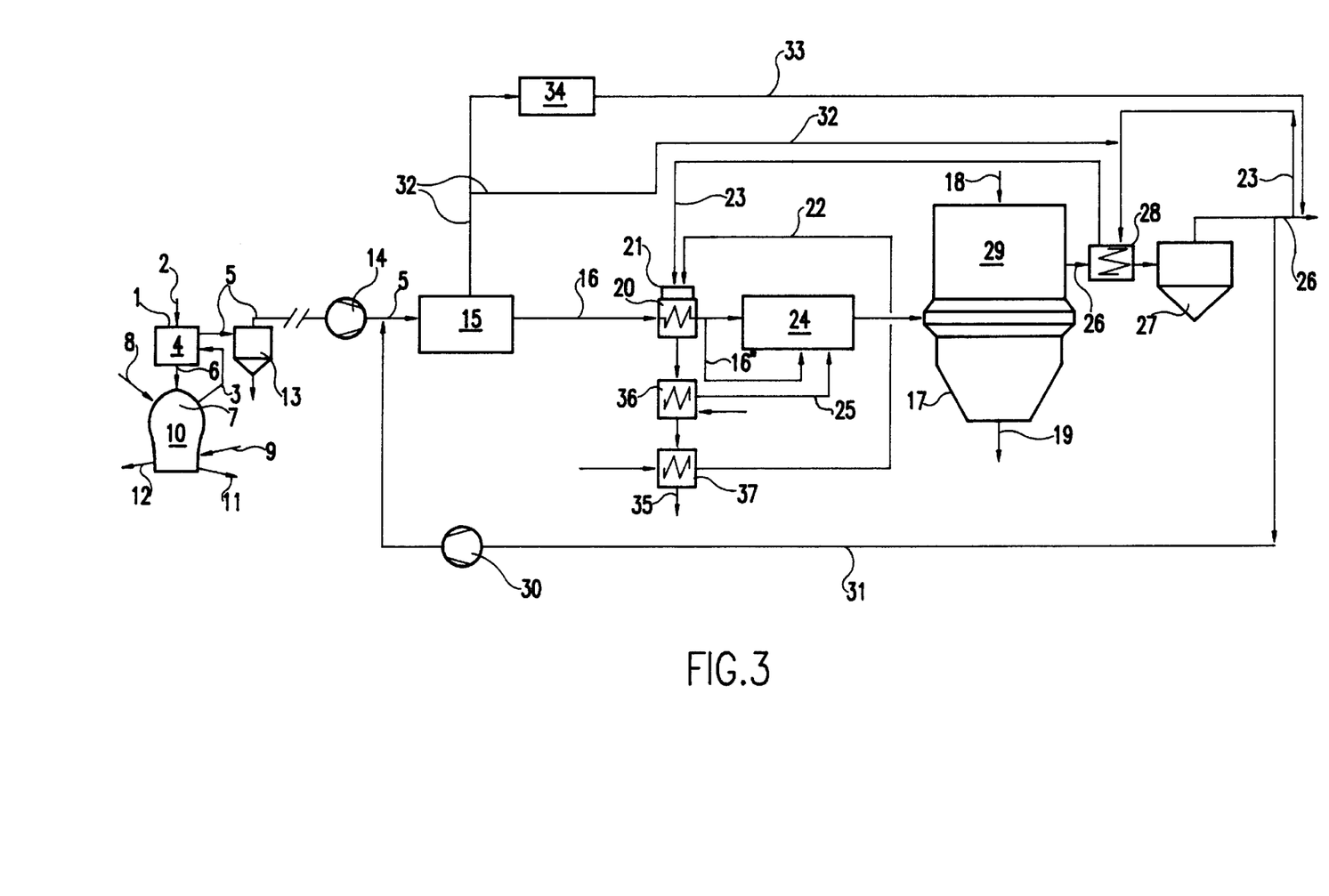

According to the process variant represented in FIG. 3, reducing gas preheated in the heat exchanger 20—this being branched off by means of a branch duct 16"—is used for the partial combustion taking place in the afterburning means 24 such that sensible heat of the smoke gas formed in the burner 21 of the heat exchanger 20 is made available to the partial combustion not only via the oxygen fed, but also via the reducing gas provided for the partial combustion. Hence the optimum utilization of residual heat is achieved, which is reflected not only by an enhanced quality of the reducing gas, but also by an increase in production.

Figure 4:
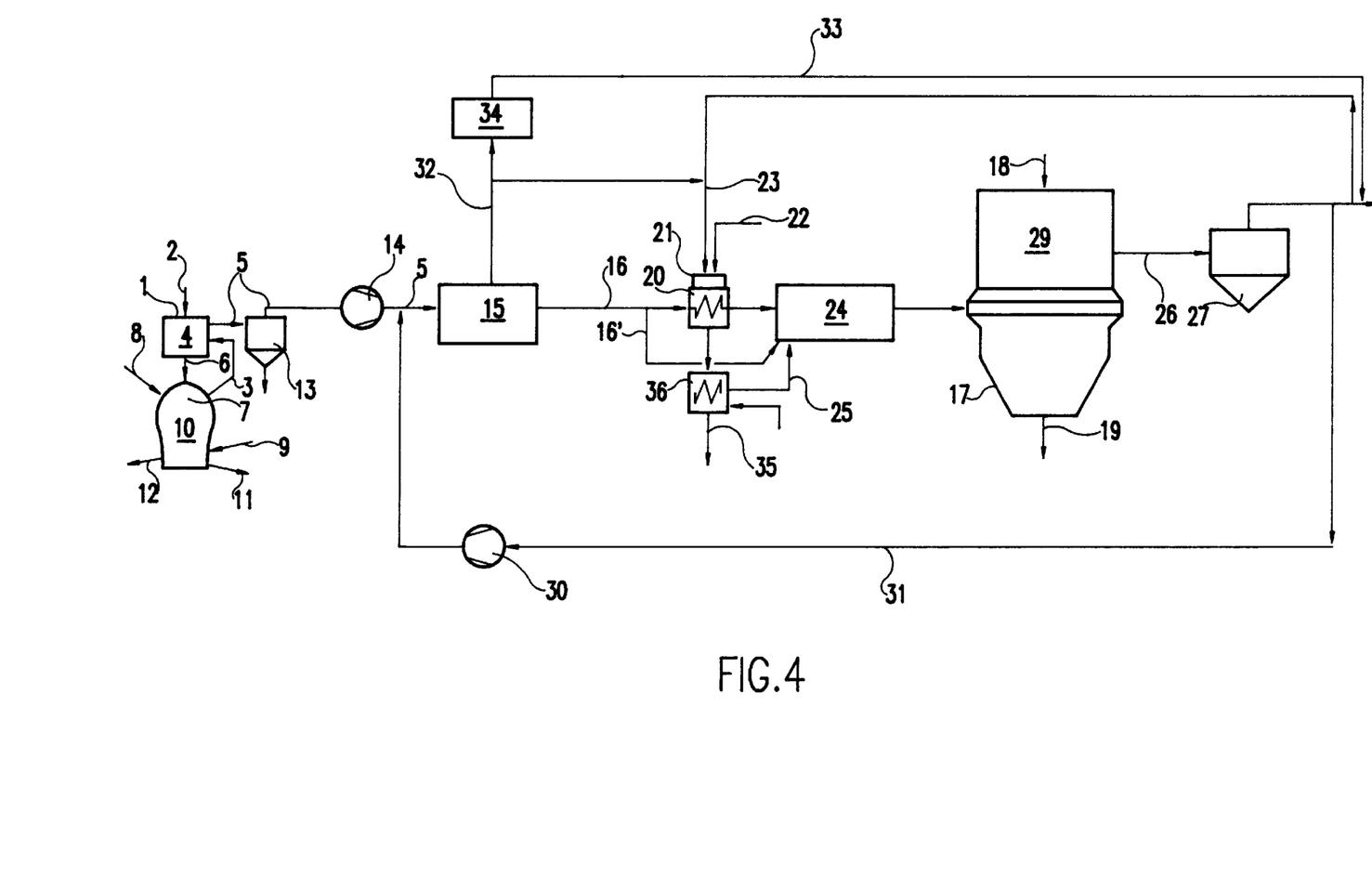

FIG. 4 illustrates a simplified process variant, in which the export gas fed to the burner 21 of the heat exchanger 20 and derived from the further reduction process is fed into a heat exchanger 20 without previous heating. In that process variant, merely the sensible heat contained in the smoke gas is utilized for heating the oxygen fed to the partial combustion.

Figure 5:
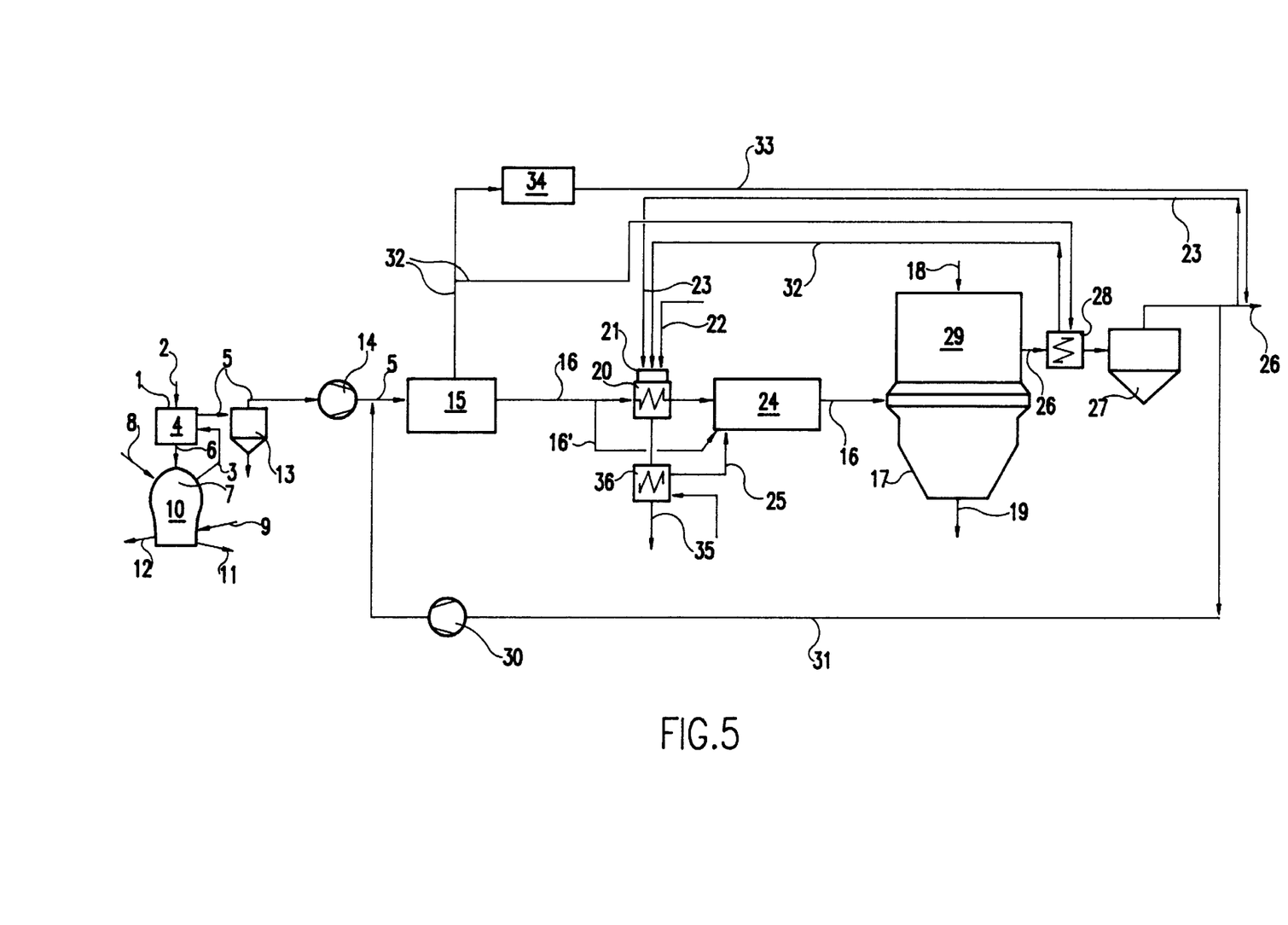

FIG. 5 depicts a variant of the process illustrated in FIG. 1, the process according to FIG. 5 differing from the process according to FIG. 1 in that the export gas branched off by means of the branch duct 23 is no longer conducted via the heat exchanger 28, but is conveyed directly to the burner 21 of the heat exchanger 20. Thereby, the calorific value of the branched-off export gas is preserved, that high-quality export gas being available to the burner 21 as an assistant combustion gas. Since the offgas of the $CO_2$ elimination plant 15 carried away in the offgas duct 32 is no longer mixed with the export gas branched off via the branch duct 23, but is heated in the heat exchanger 28 in the unmixed state, it reaches a higher temperature level; it is fed to the burner 21 separate from the branched-off export gas. This embodiment offers the advantage that the pressure loss in the branch duct 23 is lower than in the variant illustrated in FIG. 1, because duct 23 is no longer conducted through the heat exchanger 28. It is true that the offgas derived from the $CO_2$ elimination plant 15 in the embodiment represented in FIG. 5 is no longer fattened by the branched-off export gas such that its inflammability is not enhanced, yet this is by far compensated for by improving the limits of inflammability of that offgas by means of the enhanced temperature increase occurring in the heat exchanger 28 in combination with an assistant burner operated by the branched-off export gas.

Figure 6:
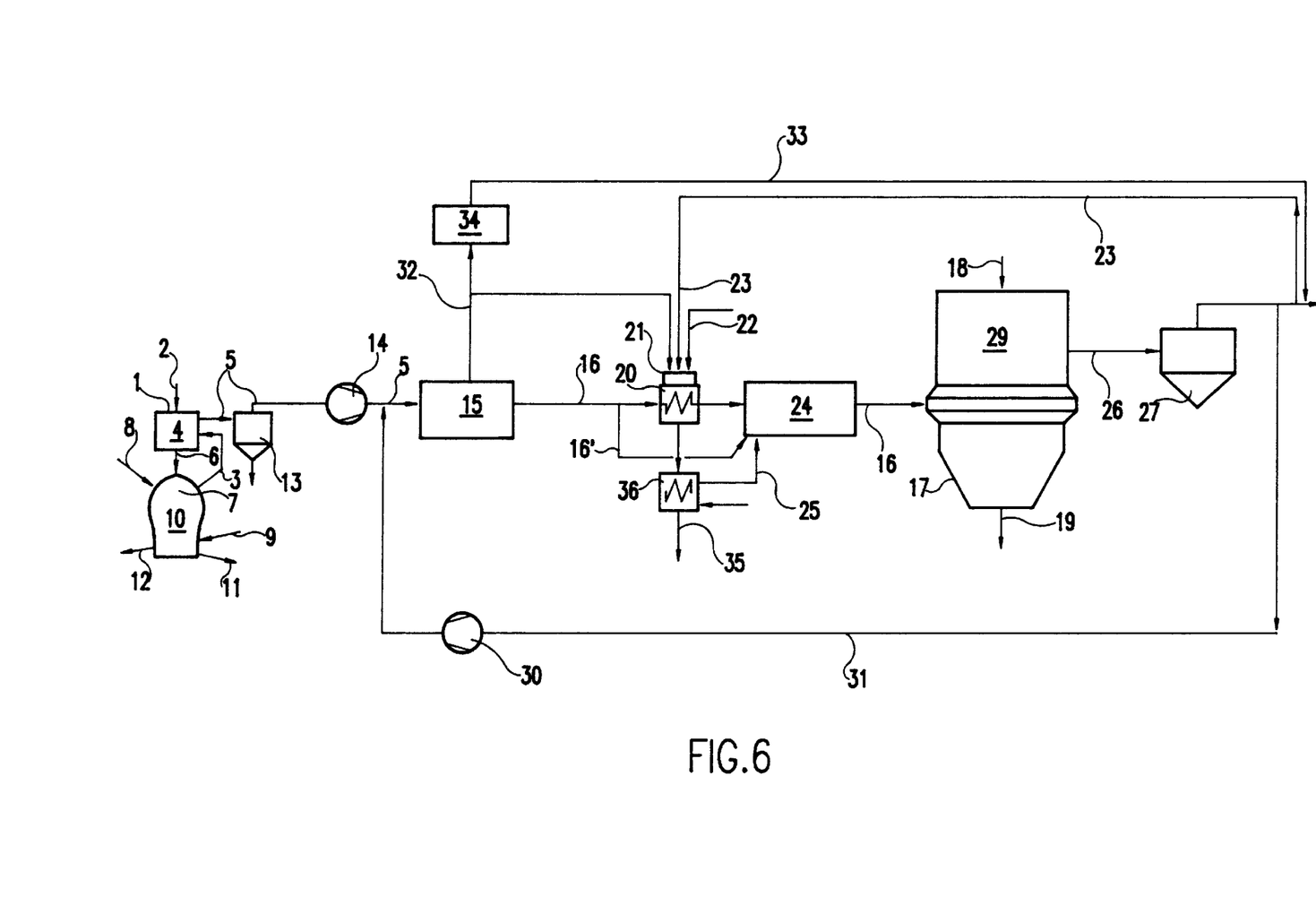

According to the variant illustrated in FIG. 6, of the process according to the invention represented in FIG. 4, the export gas branched off by means of the duct 23 likewise is no longer mixed with the offgas from the $CO_2$ elimination plant 15, but both gases are fed to the burner 21 of the heating means 20 separately, the branched-off export gas again assuming an assistant burning function.

The invention is not limited to the exemplary embodiments dealt with in the description of the Figures, but may be modified in various aspects. It is, for instance, possible to provide for a reduction of fine ore by fluidization instead of the shaft furnace 1 being operated according to the fixed bed method, i.e., to replace the shaft furnace 1 with one or several fluidized bed reactors. The same holds for the further reduction process, i.e., also the reduction shaft furnace 17 may be replaced with fluidized bed reactors in which fine ore is reduced by fluidization.

Furthermore, it may be advantageous if the heat exchanger 36 for heating oxygen precedes the heat exchanger 20 such that the hot gases forming in the burner 21 heat the oxygen first and the purified export gas only afterwards. Thereby, the oxygen may be heated to higher temperatures and hence used in smaller quantities. This offers the additional advantage that less CO and $H_2$ are reacted in the afterburning means 24 such that the ratios of $CO/CO_2$ and $H_2/H_2O$ may be improved even further.

The improvements in the $CO/CO_2$ and $H_2/H_2O$ ratios during the reaction occurring in the afterburning means 24 are explained by way of the following examples:

In a plant according to FIG. 1, in which, however, the heat exchanger 20 for heating the export gas is preceded by the heat exchanger 36 for heating oxygen as described above—the hot combustion gas formed in the burner 21 flowing through the heat exchanger 36 first and through the heat exchanger 20 only afterwards—the export gas derived from the first reduction zone 4 has a temperature of 45° C. immediately before its introduction into the heat exchanger 20. A portion of that export gas is branched off and fed to the afterburning means 24 at that temperature.

Oxygen preheated to 500° C. in the heat exchanger 36 via duct 25 likewise is conveyed to the afterburning means 24, in which a hot gas of 4,755° C. is generated by combustion. That hot gas in the afterburning means 24 is mixed with export gas heated to 514° C. in the heat exchanger 20 such that finally a reducing gas having a temperature of about 800° C. is formed, which is fed to the further reduction shaft furnace 17 by means of the reducing-gas supply duct 16.

In view of the prior art, according to which oxygen is supplied to the afterburning zone at room temperature, an increase in quality is obtained by the fact that less oxygen must be fed to the afterburning means 24 and hence less CO and $H_2$ must be reacted during combustion. As a result, the $CO/CO_2$ ratio has been improved by approximately 1.4% and the $H_2/H_2O$ ratio by approximately 3.3%.

In a plant according to FIG. 3, export gas again having a temperature of 45° C. reaches the heat exchanger 20 and there is heated to a temperature of 514° C. and is supplied to the afterburning means 24 at that temperature. A portion of the thus heated export gas is fed to the afterburning means 24 through duct 16", together with oxygen heated to 250° C. in the heat exchanger 36, and is burned. Thereby, a hot gas having a temperature of 4,996° C. is formed, from which a reducing gas having a temperature of 801° C. results.

Also in that case the amount of oxygen fed can be reduced, hence resulting a $CO/CO_2$ ratio enhanced by 3.2% as opposed to the prior art. The $H_2/H_2O$ ratio has been improved by 7.8%.

If, in accordance with the above-described exemplary embodiment according to FIG. 3, the heat exchanger 20 is preceded by the heat exchanger 36 such that the hot gases conducted in the burner 21 flow through the heat exchanger 36 first and through the heat exchanger 20 only afterwards, heating of the oxygen to 500° C. is feasible so that the latter may be further reduced in terms of quantity for the combustion taking place in the afterburning means 24. By burning, by means of the thus heated oxygen, a portion of the export gas heated to 514° C., a hot gas having a temperature of 5,051° C. forms, which upon mixing with the residual export gas heated to 514° C., brings about a reducing gas having a temperature of 800° C. and an improvement in the $CO/CO_2$ ratio by 3.9%. The $H_2/H_2O$ ratio has been improved by 8.9%.

In the following, the advantage of heating in the heat exchanger 28 the $CO_2$-containing offgas separated from the $CO_2$ elimination plant 15 by means of the offgas duct 32 will be explained, wherein, however, exclusively $CO_2$-containing offgas and no export gas emerging from the further reduction shaft furnace 17 via duct 26 is heated in the heat exchanger 28. The $CO_2$-containing offgas separated from the $CO_2$ elimination plant 15 has a temperature of 45° C. and is heated in the heat exchanger 28 to a temperature of about 280° C. in order to increase its inflammability. Such heating of the offgas has the advantage that export gas from the further reduction process need not be supplied any more for burning the same.

The $CO_2$-containing offgas thus heated to 280° C. is supplied to the burner 21 through duct 23 and there is burned by means of non-preheated air, i.e., air having a temperature of about 25° C. In doing so, a hot gas having a temperature of 851° C. is formed, by aid of which export gas from the first reduction process may be heated in the heat exchanger 20. By such heating of the $CO_2$-containing offgas to above inflammation temperature, it is feasible to recirculate the export gas incurring in the further reduction process completely via the duct 31, thus fully utilizing the same for direct reduction.

Although the present invention has been described in relation to particular embodiments thereof, many other variations and modifications and other uses will become apparent to those skilled in the art. Therefore, the present invention is to limited not by the specific disclosure herein, but only by the appended claims.

We claim:

1. A process for producing liquid pig iron or liquid steel preproducts and sponge iron from charging substances of iron ore, wherein the charging substances in a first reduction zone are directly reduced to sponge iron, the sponge iron in a meltdown gasifying zone is melted under a supply of carbon carriers and an oxygen-containing gas and a reducing gas containing CO and $H_2$ is produced, which is introduced into the first reduction zone, is reacted there and is drawn off as an export gas, and wherein the drawn-off export gas is subjected to $CO_2$ elimination as well as heating to produce export gas at least largely free of $CO_2$ which is fed to at least a second reduction zone for direct reduction of further iron ore and after the reaction with the iron ore is drawn off as an export gas from the second reduction zone, wherein heat of the export gas drawn off the second reduction zone is used for heating the export gas derived from the first reduction zone.

2. A process according to claim 1, wherein, for heating, sensible heat is recuperatively withdrawn from the export gas drawn off the second reduction zone in a hot unscrubbed state and by means of a heat carrier is transmitted to the export gas derived from the first reduction zone.

3. A process according to claim 2, wherein the heat carrier is comprised of scrubbed export gas of the second reduction zone.

4. A process according to claim 3, wherein, for heating the export gas derived from the first reduction zone, export gas drawn off the second reduction zone after scrubbing is recuperatively heated, and burned, by unscrubbed export gas of the second reduction zone, the smoke gases recuperatively heating the export gas derived from the first reduction zone.

5. A process according to claim 1, wherein preheating of the export gas derived from the first reduction zone is effected by burning export gas derived from the second reduction zone and by recuperative heat transfer of the heat contained in the smoke gases, and subsequently further heating is effected by a partial combustion of the export gas derived from the first reduction zone, the thermal energy not consumed in the second reduction zone being fed to said partial combustion of the export gas.

6. A process according to claim 5, wherein one of oxygen or oxygen-containing gas used for said partial combustion is subjected to recuperative heating by means of chemically bound and/or sensible heat contained in the export gas derived from the second reduction zone.

7. A process according to claim 6, wherein at least a portion of the export gas drawn off the second reduction zone is burned and the smoke gas thereby forming recuperatively gives off sensible heat to the oxygen or oxygen-containing gas, respectively.

8. A process according to claim 5, wherein portion of the preheated export gas drawn off the first reduction zone is used as a combustion gas along with one of oxygen or an oxygen-containing gas for burning the export gas.

9. A process according to claim 4, wherein, for burning export gas derived from the second reduction zone, air is admixed to said export gas, which air is recuperatively heated by smoke gas forming in the combustion of export gas drawn off the second reduction zone.

10. A plant for carrying out the process according to claim 1, the plant comprising:
   a first reduction reactor for iron ore;
   a melter gasifier;
   a supply duct for a reducing gas, the supply duct connecting the melter gasifier with the first reduction reactor;
   a conveying duct for a reduction product formed in the first reduction reactor and connecting the first reduction reactor with the melter gasifier;
   an export-gas discharge duct departing from the first reduction reactor;
   supply ducts for oxygen-containing gases and carbon carriers running into the melter gasifier;
   a tap for pig iron and slag provided at the melter gasifier;
   at least a second reduction reactor for receiving additional iron ore;
   a reducing-gas supply duct connected to said second reduction reactor;
   an export-gas discharge duct from said second reduction reactor;
   a discharge means for a reduction product formed in said second reduction reactor; and
   a $CO_2$ elimination plant;
   wherein the export-gas discharge duct of the first reduction reactor runs into the $CO_2$ elimination plant; and
   the reducing-gas supply duct of the second reduction reactor departs from the $CO_2$ elimination plant and runs into the second reduction reactor via a heating means for the export gas purified from $CO_2$,
   and wherein the export-gas discharge duct of the second reduction reactor runs into a heat exchanger and from there leads to a scrubber; and
   a branch duct branches off the export-gas discharge duct after said scrubber and runs into the heat exchanger for recuperatively heating the branched-off scrubbed export gas by means of unscrubbed export gas and, departing therefrom, is conducted to the heating means.

11. A plant according to claim 10, wherein the branch duct runs into a burner of the heating means and smoke gas of the burner, by means of a smoke-gas discharge duct via a heat exchanger, is conducted to recuperative heating of one of an oxygen-containing gas or oxygen fed to the heating means.

12. A plant according to claim 10, wherein the branch duct runs into a burner of the heating means and smoke gas of the burner is fed to recuperative heating of an oxygen-containing gas by means of a smoke-gas discharge duct via a heat exchanger, the heated air being fed to the burner of the heating means.

13. A plant according to claim 10 wherein a branch duct departs from the reducing-gas supply duct after the heat exchanger serving to heat the reducing gas fed to the second reduction reactor and runs into an afterburning means together with a duct supplying one of oxygen or an oxygen-containing gas.

14. A plant for carrying out the process according to claim 1, the plant comprising:
   a first reduction reactor for iron ore;
   a melter gasifier;
   a supply duct for a reducing gas connecting the melter gasifier with the first reduction reactor;
   a conveying duct for a reduction product formed in the first reduction reactor and connecting the first reduction reactor with the melter gasifier;
   an export-gas discharge duct departing from the first reduction reactor;
   supply ducts for oxygen-containing gases and carbon carriers running into the melter gasifier;
   a tap for pig iron and slag provided at the melter gasifier;
   a second reduction reactor for receiving additional iron ore;
   a reducing-gas supply duct connected to said second reduction reactor;
   an export-gas discharge duct departing from said second reduction reactor;
   a discharge means for a reduction product formed in said second reduction reactor;
   a $CO_2$ elimination plant connected to said second reduction reactor and producing export gas purified of $CO_2$; and
   a heating means for heating the export gas purified of $CO_2$, the heating means having a burner,
   wherein the export-gas discharge duct of the first reduction reactor runs into the $CO_2$ elimination plant, and
   the reducing-gas supply duct of the additional reduction reactor departs from the $CO_2$ elimination plant and runs into the second reduction reactor via the heating means for the export gas purified of $CO_2$, and wherein a branch duct runs from the export-gas discharge duct (26) of the second reduction reactor into the burner of the heating means, and the smoke gas of the burner, by means of a smoke-gas discharge duct and via a heat exchanger, is conducted to recuperative heating of one of an oxygen-containing gas or oxygen and the heated oxygen-containing gas or oxygen is conducted to the heating means via a duct.

15. A plant according to claim 14, wherein the heated oxygen-containing gas or oxygen is fed to an afterburning means of the heating means together with reducing gas fed via a branch duct departing from the reducing-gas supply duct.

16. A merchantable product, made of pig iron or steel preproducts produced by a process according to claim 1.

17. A process for producing liquid pig iron or liquid steel preproducts and sponge iron from charging substances of iron ore, comprising the steps of:

directly reducing the charging substances to sponge iron in a first reduction zone;

melting the sponge iron in a meltdown gasifying zone under a supply of carbon carriers and an oxygen-containing gas to produce a reducing gas containing CO and $H_2$;

introducing the reducing gas into the first reduction zone;

reacting the reducing gas in the first reduction zone;

drawing off the reducing gas from the first reduction zone as an export gas;

subjecting the drawn-off export gas to $CO_2$ elimination, as well as heating, to produce a reducing gas at least largely free of $CO_2$;

drawing off the reducing gas at least largely free of $CO_2$;

feeding the reducing gas at least largely free of $CO_2$ to at least one further reduction zone for the direct reduction of further iron ore and after the reaction with the iron ore is drawn off as an export gas; and heating the export gas derived from the first reduction zone using heat of the export gas leaving the further reduction zone.

18. A process according to claim 1, wherein the export gas drawn off the second reduction zone and used for heating the export gas derived from the first reduction zone is a minimum portion, remaining export gas being available as a recycle gas in an amount as large as possible.

19. A process according to claim 17, wherein the export gas drawn off the further reduction zone and used for heating the export gas derived from the first reduction zone is a minimum portion, remaining export gas being available as a recycle gas in an amount as large as possible.

* * * * *